Nov. 22, 1955    R. C. BENSON    2,724,288
VALVE OPERATOR

Filed Oct. 21, 1952    7 Sheets-Sheet 1

INVENTOR.
RONALD C. BENSON
BY
John D. Myers
ATTORNEY

Nov. 22, 1955   R. C. BENSON   2,724,288
VALVE OPERATOR

Filed Oct. 21, 1952   7 Sheets-Sheet 3

*INVENTOR.*
RONALD C. BENSON
BY
John D. Myers
ATTORNEY

Nov. 22, 1955  R. C. BENSON  2,724,288
VALVE OPERATOR
Filed Oct. 21, 1952  7 Sheets-Sheet 4

INVENTOR.
RONALD C. BENSON
BY
*John D. Myers*
ATTORNEY

Nov. 22, 1955     R. C. BENSON     2,724,288
VALVE OPERATOR

Filed Oct. 21, 1952     7 Sheets-Sheet 5

INVENTOR.
RONALD C. BENSON
BY
*John D. Myers*
ATTORNEY

INVENTOR.
RONALD C. BENSON
BY
John D. Myers
ATTORNEY

Nov. 22, 1955 R. C. BENSON 2,724,288
VALVE OPERATOR
Filed Oct. 21, 1952 7 Sheets-Sheet 7
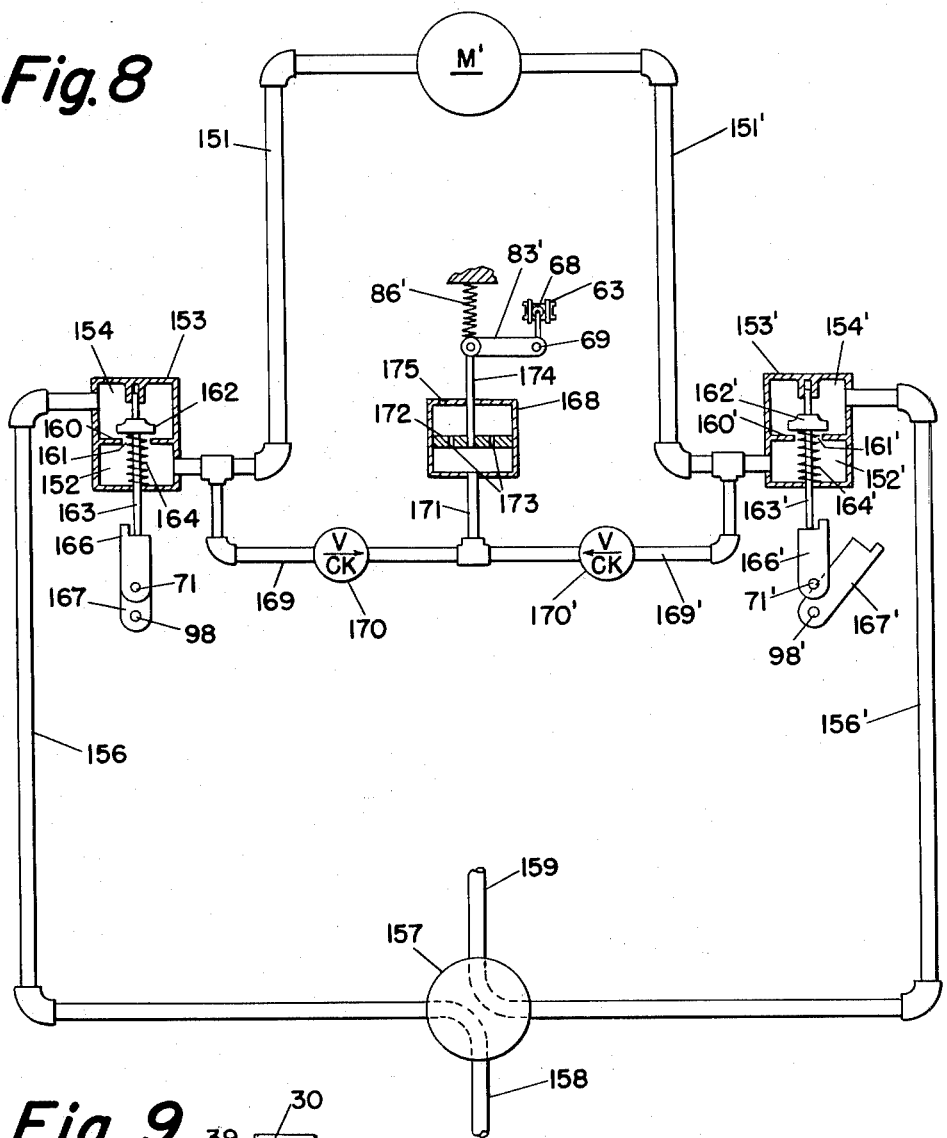
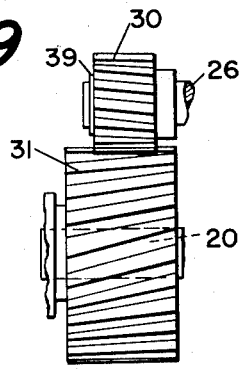
INVENTOR.
RONALD C. BENSON
BY John D. Myers
ATTORNEY

United States Patent Office 2,724,288
Patented Nov. 22, 1955

2,724,288

VALVE OPERATOR

Ronald C. Benson, Merchantville, N. J.

Application October 21, 1952, Serial No. 316,040

17 Claims. (Cl. 74—625)

This invention relates generally to valve operating mechanisms, and pertains particularly to controls for power operated valves wherein the torque applied for seating or overcoming other forces opposing movement of the valve closure member is automatically limited to a predetermined amount.

In the common types of valves with which the present invention is adapted to be used the gate, disc, plug, or other closure member is positioned in the valve in response to rotation of a torque transmitting member, the latter commonly taking the form of a worm. In one form of such valves, a rotation of the torque transmitting worm may be transmitted directly to a spindle which carries or actuates the valve closure member, and rotation of the spindle is effective to position the closure member. Alternatively, the spindle may be restrained against rotation and its longitudinal movement employed to position the closure member; in this case the spindle is customarily threaded and surrounded by a nut which is in driven relation with the torque transmitting worm. With either construction, however, any resistance to positioning of the closure member places a corresponding load on the torque transmitting worm.

In the usual construction of operating mechanisms for such valves, the torque transmitting worm is free to move longitudinally in response to such a load, and this movement of the worm is commonly utilized to open a power circuit to cut off driving power to the worm after the latter has traveled a predetermined distance longitudinally. Where torque seating is desired, a spring is positioned around the worm shaft to oppose its axial movement, whereby the resistance to deformation of the spring will determine the amount of torque which will be permitted to be applied to the valve spindle before cutting off power to the driving worm.

In such an arrangement, the spring is required to take the full thrust resulting from the maximum permissible torque at which the valve control is rated and, therefore, in large capacity valves the spring has necessarily been rigid or stiff due to space limitations in the control housing, with the result that such springs have been characterized in the past with a low spring ratio and a correspondingly low life factor.

In the improved valve operators of my invention, however, I employ a torque responsive mechanism of novel construction which enables me to use a much lighter spring having a higher spring ratio to oppose movement of the displaceable member of the mechanism, whereby the spring life likewise is indefinitely prolonged beyond that possible with the aforementioned construction of the prior art.

It is an object of my invention to provide a torque responsive valve operator of improved construction affording a high degree of precision in adjustment of torque seating of the valve closure member.

Another object is to provide a valve operator of simple and compact construction in which the necessity for replacement of parts due to fatigue is greatly reduced.

A further object is to provide a valve operator of the above description including in interlocking relation with the torque responsive mechanism a control which renders the former ineffectual to cut off power for operating the valve when overcoming torque due to unseating of the valve.

An additional object is to provide a valve operator of the above description having both power- and manually-actuated means for operating the valve and a clutch for selectively coupling either of said means with the torque transmitting mechanism for positioning the valve closure member, the clutch normally engaging the power drive when power is supplied thereto, but automatically uncoupling the power drive and coupling the manual drive when said power is discontinued.

A still further object is to provide means for causing the clutch to pause in its travel from its power drive coupling position to its manual drive coupling position, thereby avoiding transmission to the manual drive of any residual motion of the valve parts earlier imparted thereto by the power drive.

In order that the invention may be readily understood and its practical advantages full appreciated, reference may be had to the accompanying drawings in which I illustrate apparatus constructed in accordance with and embodying the principles of the invention. In the drawings:

Fig. 1 is a vertical sectional view through a valve operator embodying the invention in a preferred form;

Figs. 2 and 3 are sectional views taken substantially along the lines 2—2 and 3—3, respectively, of Fig. 1, certain minor details forward of the section lines being shown in elevation for the purpose of clarity;

Fig. 8 is a schematic diagram illustrating pneumatic means for controlling a pneumatically operated embodiment of the invention;

Fig. 9 illustrates a pair of helical gears employed in the torque limiting mechanism of the valve operator of the invention.

Figure 1:
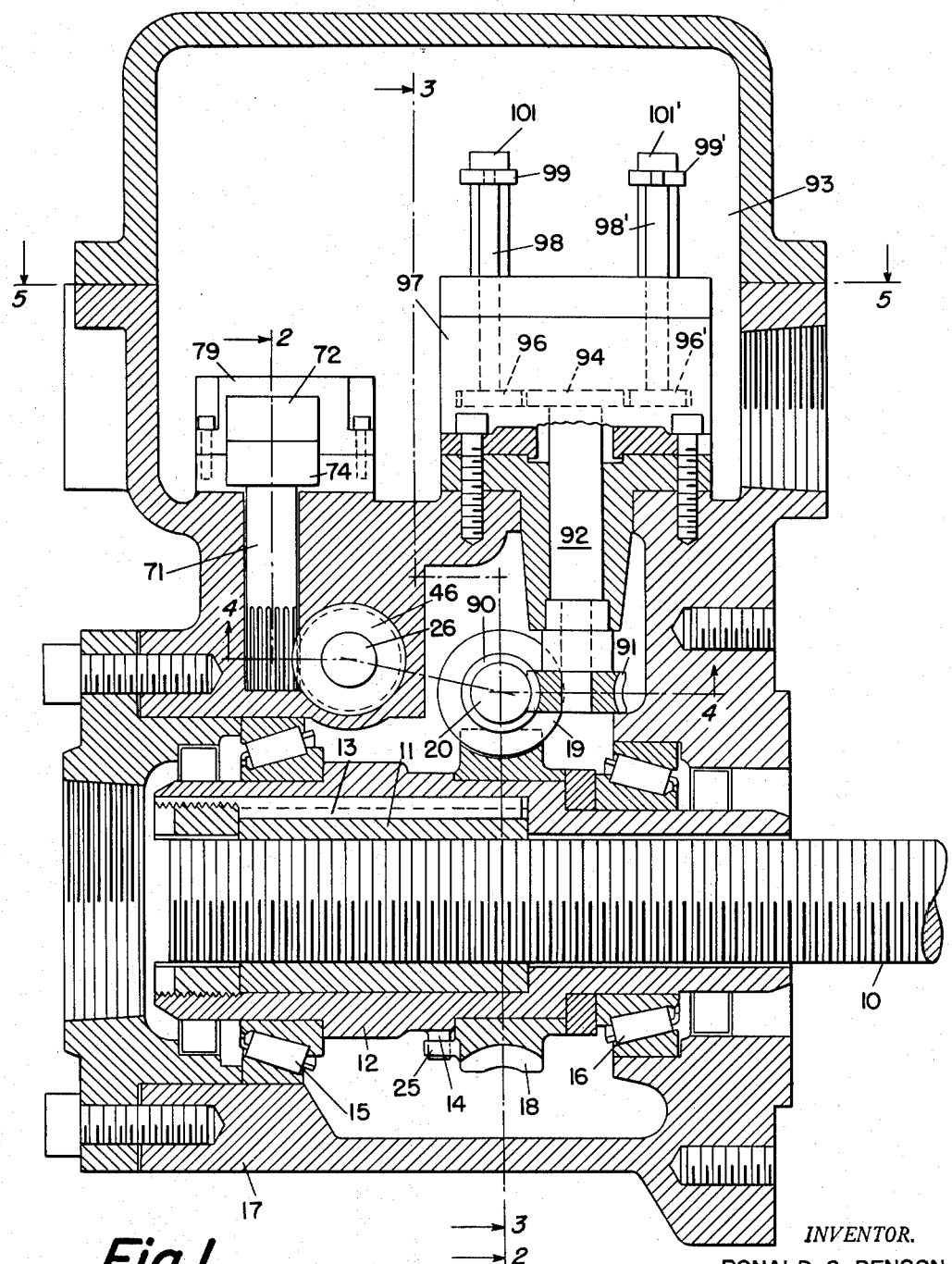

In the drawings there have been included for purposes of illustration several parts of a valve of the type in which the valve closure member is positioned by axial movement of a spindle, but it will be understood that my valve operator may be used as well with other types of valves wherein rotation of a torque transmitting member may be used for positioning the closure member.

Referring now to the drawings, the valve operator of the invention is illustrated in conjunction with a threaded spindle 10 which carries a valve gate or other closure member (not shown), the spindle 10 engaging a nut 11 fixed to a collar 12 by a key 13. The spindle is restrained against rotation in any convenient manner and, accordingly, rotation of the nut 11 causes the spindle to move axially thereof toward and away from the valve seat (not shown), thereby positioning the valve gate. The collar 12, which carries a lug 14, is rotatably mounted in thrust bearings 15 and 16 carried by a housing 17 above the valve. A worm gear 18 loose on the collar 12 is meshed with a worm 19 fast on a shaft 20 which is journaled in bearings 21 and 22 in the housing 17. Split rings 23 and 24, reposing in grooves in the housing 17, prevent the bearings 21 and 22 from moving outwardly from their illustrated positions, whereby the shaft 20 and worm 19 are effectively restrained against axial movement. The worm gear 18 carries a hammer portion 25 for driving engagement with the lug 14 in known manner.

A second shaft 26 is mounted in a bore 27 in the housing 17 and journaled adjacent its ends in bearings 28 and 29 which are slidable in the bore. At one end of the shaft 26 is a pinion 30 which meshes with a gear 31 provided with a bushing 32 mounted loosely on an extension of the shaft 20 projecting beyond a bearing 21. The gear 31 is maintained in spaced relation to the bearing 21 by means of a spacer ring 33, and a split ring 34 prohibits longitudinal movement of the gear 31 outwardly of the shaft 20. Clutch jaws 35 are formed in the outer face of gear 31.

A gear 36 is fixed to the opposite end of the shaft 26 and is in permanent engagement with a driving pinion 37 fast on a shaft 38 driven by any convenient source of motive power, such as a motor M. Pinion 30 and gear 36 are prevented from moving outwardly of the shaft 26 by any convenient means, as by split rings 39 and 40 resting in circumferential grooves at the ends of the shaft. At least one of the pairs of gears 30, 31 and 36, 37 is provided with helical teeth, as illustrated in Fig. 9, so that when a load is placed on the gear train including these gears, e. g. on the gear 31, a thrust will result which will tend to displace the shaft 26 and its bearings 28 and 29 axially in the bore 27. Spacers 41 and 42 separate the pinion 30 and gear 36, respectively, from bearings 28 and 29. Loose on the shaft 26 are two annularly grooved collars or racks 46, 47 spaced apart and biased away from one another by a compression spring 48. Split rings 49 and 50, carried respectively in circumferential grooves in the bore 27, are provided to limit longitudinal movement of the racks 46, 47 away from each other. A spacer ring 51 separates bearing 28 from the rack 46 and a spacer ring 52 adjacent the opposite end of the shaft separates bearing 29 from the rack 47, these spacer rings being effective to transmit inward motion of the bearings 28 and 29 to their adjacent racks.

Coaxial with the shaft 20 is a stub shaft 53 journaled at one end in a bearing 54 supported in the housing 17, and fixed to the free end of the shaft 53 is a spur gear 55 and a clutch member 56 having jaws 57. The spur gear 55 is in permanent engagement with a gear 58 fixed to a shaft 59 which is journaled in bearings 60 and 61 also supported in the housing 17. A hand wheel 62 fixed to the end of the shaft 59 outside the housing is provided for manual operation of the valve when desired, as will appear hereinafter.

Figure 5:
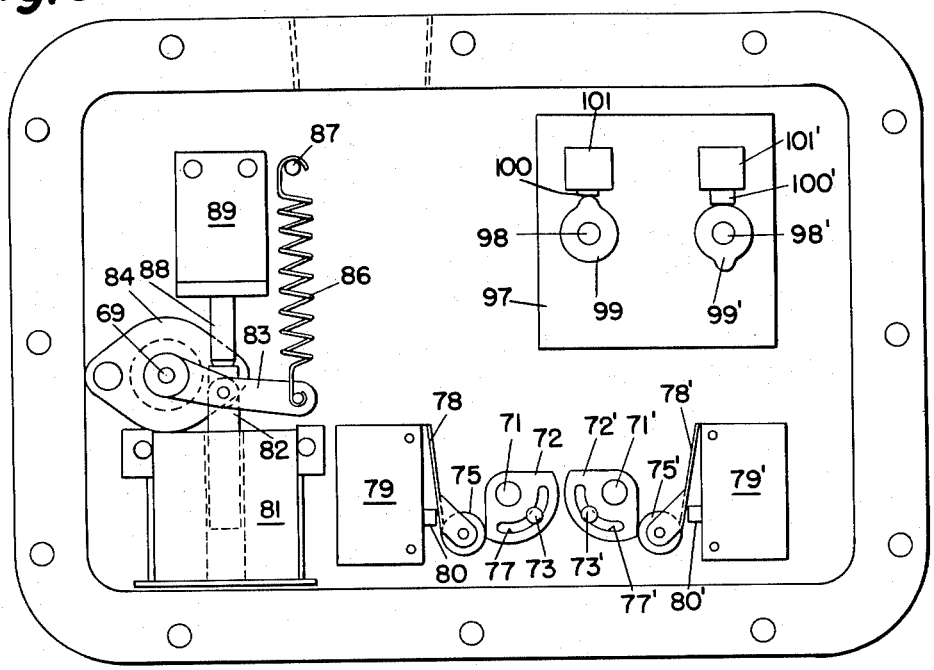
Fig. 5 is an elevation view along the line 5—5 of Fig. 1 illustrating the switch compartment with the cover removed.
Figure 6:
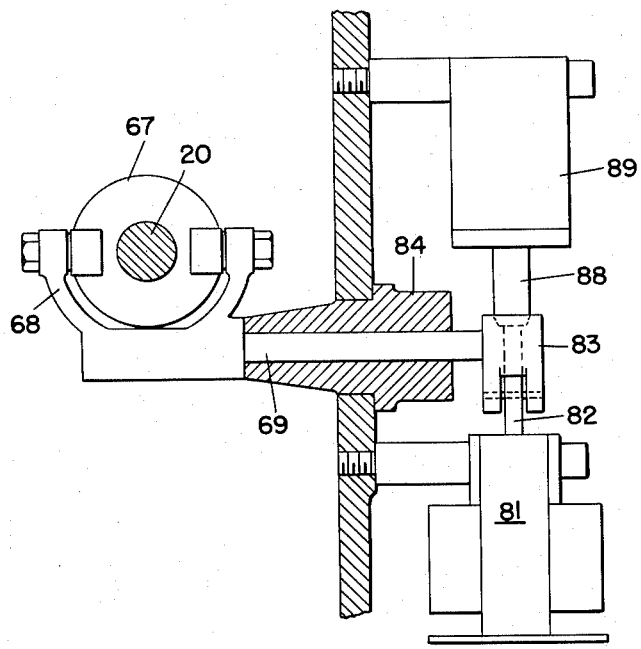
Fig. 6 is a detail of the clutch mechanism.

A clutch 63 is splined to the shaft 20, as shown at 65, the clutch having opposed jaws 64 and 66 adapted selectively to engage jaws 35 and 57 connected respectively to the gear 31 and spur gear 55. The clutch member 63 is grooved circumferentially as at 67 for receiving a fork member 68 carried at the end of a clutch actuating shaft 69 (Figs. 5 and 6), whereby the clutch may be moved selectively into driven engagement with either the gear 31 or the spur gear 55 in a manner to be described in detail hereinafter.

Having described the torque responsive elements of my improved valve operator, I shall describe briefly its function in order that the controls therefor which will be set forth below may be more readily understood.

Figure 2:
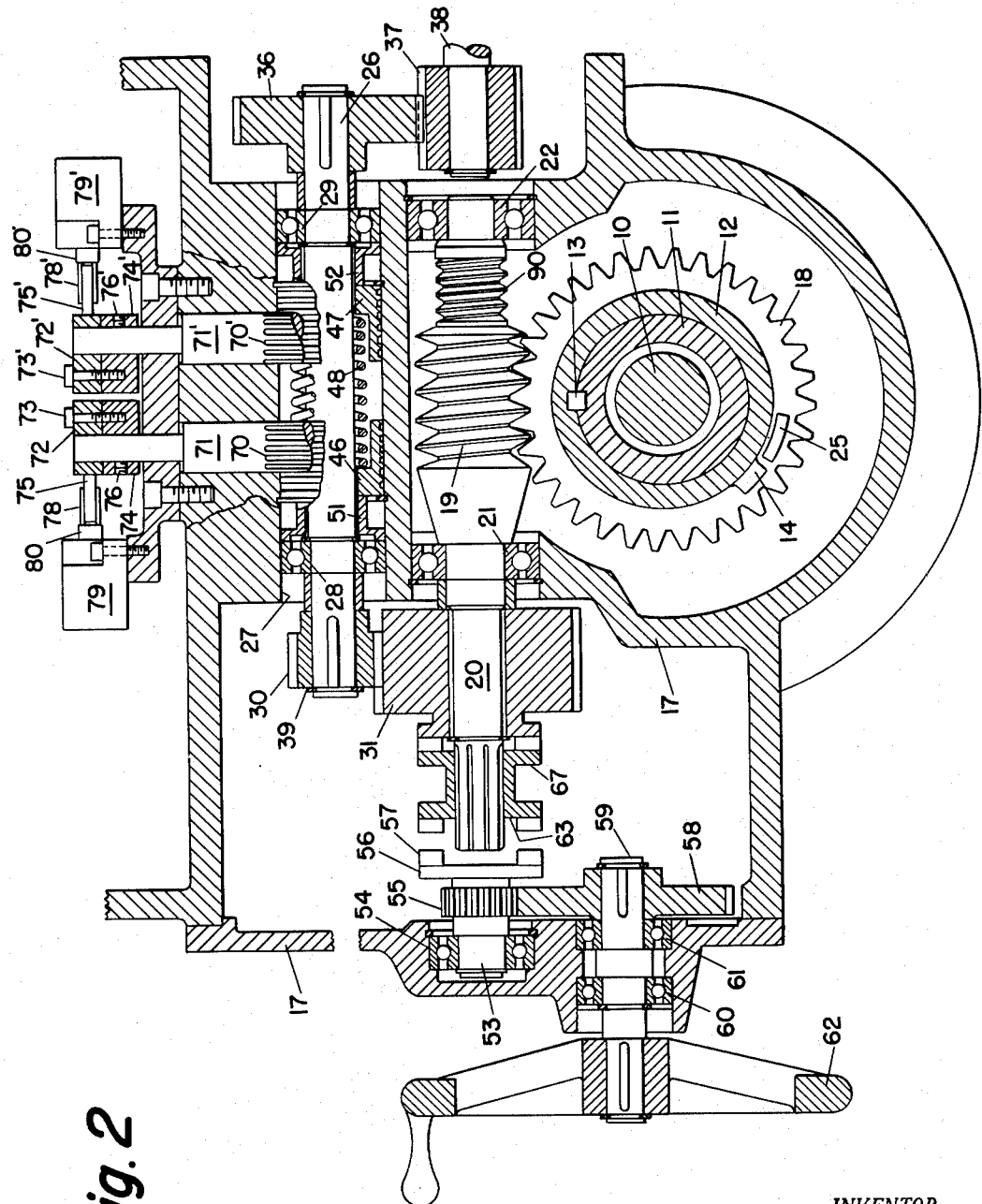
Figure 3:
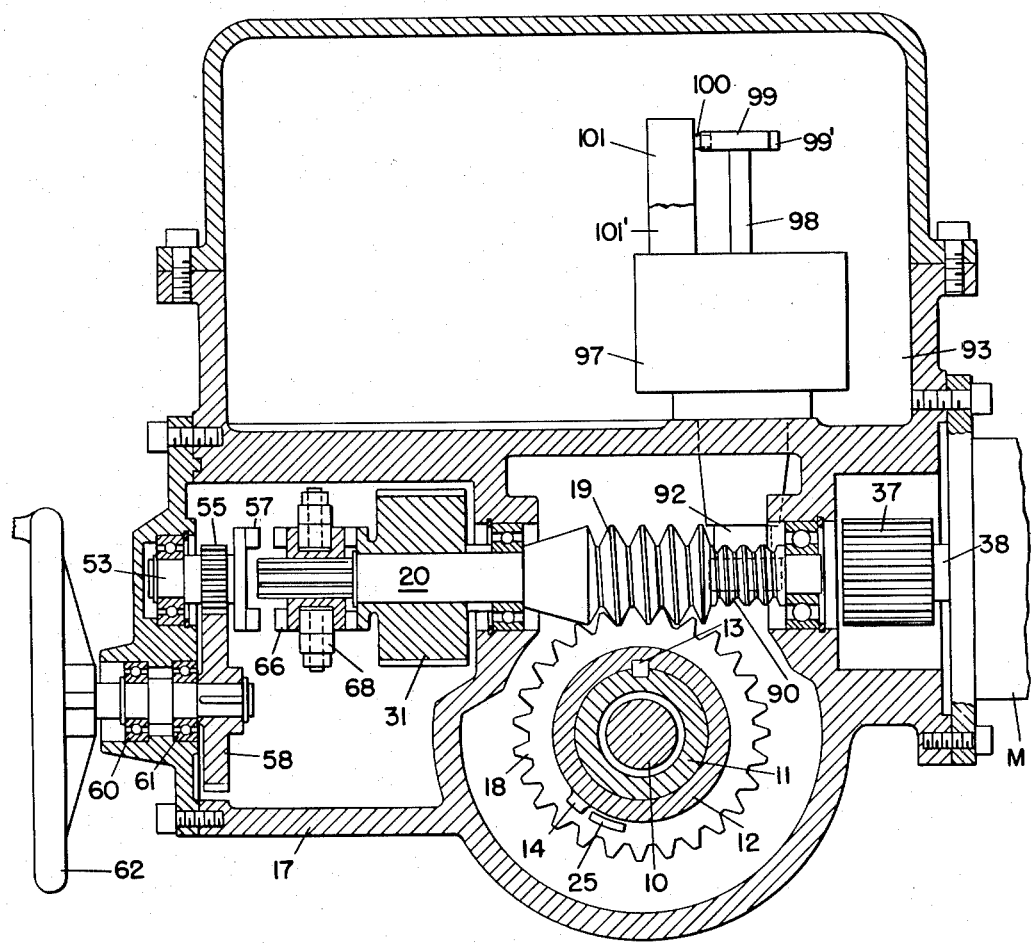
Figure 4:
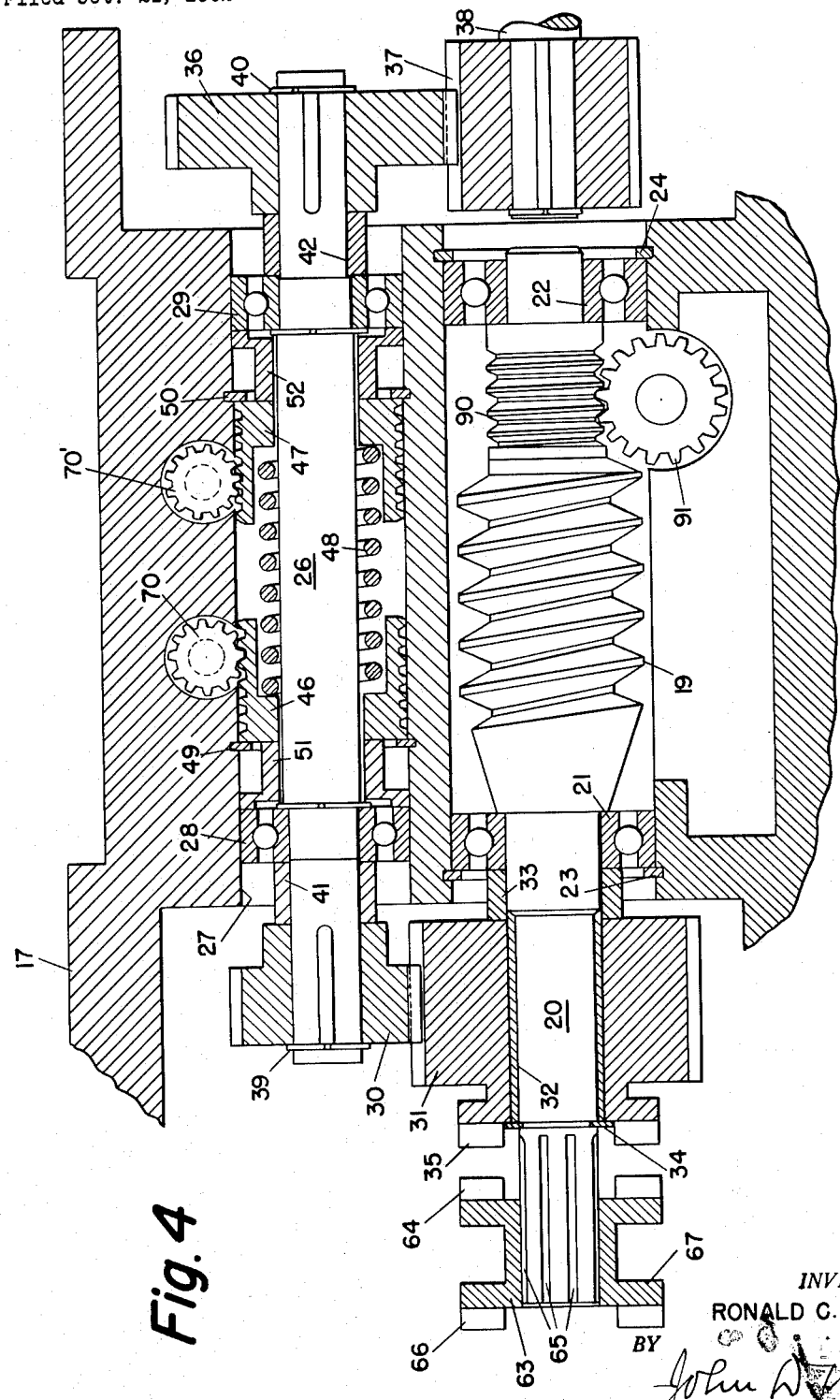
Fig. 4 is a sectional view substantially along the line 4—4 of Fig. 1.

As will be seen from Figs. 2 and 4, the floating shaft 26 is in its neutral position; that is to say, the racks 46 and 47 may move only toward one another, further separation of the racks being prevented by the rings 49 and 50. As was pointed out hereinabove, at least one of the pairs of gears 30, 31 and 36, 37 is cut with helical teeth so as to impose a longitudinal thrust on the shaft 26 when a load, as might arise when seating the valve in either direction, is applied to the gear 31 during power operation of the valve. It will thus be seen that when the motor M turns the driving pinion 37 in a given direction, a load placed on the gear 31 will cause the shaft 26 to move axially in one direction, for example, to the left in Figs. 2 and 4, whereby the rack 46 will remain stationary while the rack 47 will be moved to the left with the shaft in opposition to the spring 48. Conversely, when the motor M turns the driving pinion 37 in the opposite direction a load placed on gear 31 will cause the shaft 26 to move to the right in Figs. 2 and 4, in which case rack 47 will remain stationary against the split ring 50, and the rack 46 will move with the shaft 26 toward the rack 47 in opposition to the spring 48. It will thus be apparent that one of the racks 46, 47 may be used to cut off power to the motor when torque above a predetermined limit is exceeded in closing the valve while the other of said racks may be used to similar advantage when the mechanism is operated in the opening direction. The arrangement for utilizing these rack movements will now be described, and since the mechanism activated by one of the racks for controlling opening of the valve is identical with that activated by the other rack for controlling closing of the valve, only one of these mechanisms will be described, primed numbers being employed to identify corresponding parts in the other mechanism.

The rack 46 is in constant mesh with a pinion 70 fixed to the end of a shaft 71 (Fig. 2) at the opposite end of which is a cam 72 secured by means of a screw 73 to a support member 74 made fast to the shaft 71 by a set screw 76. The cam is provided with an arcuate slot 77 through which screw 73 passes, whereby the cam may be adjusted to any desired angular position on the shaft 71. The cam 72 is positioned adjacent a contact arm 78 of a normally closed electric switch 79 having an operating button 80 effective when depressed to open the switch. The arm 78 is biased away from the switch and is provided with a roller 75 for engagement with the cam 72.

As will be described more fully hereinafter, the switch 79 controls the flow of electricity to the valve motor M. Also in the circuit of the valve motor is a solenoid 81 (Figs. 5, 6 and 7) having an armature 82 pivotally connected to an intermediate point on a lever 83 fixed to the shaft 69 which is journaled in a bearing 84. The opposite end of the shaft 69 carries the fork 68 so that when the solenoid 81 is energized the shaft 69 is rotated through a limited arc to shift the clutch 63 causing its jaws 64 to engage the jaws 35 of the gear 31 whereby the latter is coupled to the shaft 20, putting the valve operating spindle 10 into driven relation with the primary driving pinion 37. A tension spring 86 connecting the free end of the lever 83 to a pin 87 on the housing 17 urges the arm in opposition to the solenoid, thereby biasing the clutch 63 in the direction to connect the spur gear 55 with the shaft 20 for manual operation of the valve. The armature 82 is connected to the operating shaft 88 of a conventional dash-pot 89 to delay briefly the movement of the clutch 63 from engagement with the power driven gear 31 to the manually driven gear 55, as will appear hereinafter.

Inasmuch as the torque due to unseating of the valve may cause the torque responsive mechanism just described to cut off power to the valve motor M prematurely, additional means have been provided to maintain operation of the valve motor for the brief period that large torques will be required for unseating. For this purpose I provide, as shown in Figs. 1 and 4, a second worm 90 integral with or fixed to the shaft 20 and therefore rotatable with the worm 19, the worm 90 meshing with a worm gear 91 fast on a shaft 92 extending through the housing into the switch compartment 93. The other end of the shaft 92 carries a gear 94 engaging at least two gears 96 and 96' of a gear limit mechanism 97 of conventional design, which, inasmuch as it does not comprise, per se, a part of the present invention, has been shown in the drawings (Fig. 1) in greatly simplified form, although with sufficient detail to illustrate its function. The gears 96 and 96' may, if desired, each comprise part of a gear train to reduce or increase by any desired amount the speed transmitted from the gear 94, but I have considered it sufficient for the purposes of the present invention to show the gears 96, 96' carried by shafts 98, 98' which project outwardly from the gear limit case and carry at their exposed ends adjustable cams 99, 99'. These cams are adapted to engage operating buttons 100, 100' of normally open switches 101, 101' in the circuit of the valve motor, the buttons being effective when depressed to close the switches, and the cams are so positioned on their respective shafts that one of the switches 101, 101' is closed when the valve gate is in the closed position, and the other switch is closed when the valve gate is in the open position, as will be described more fully hereinafter.

Figure 7:
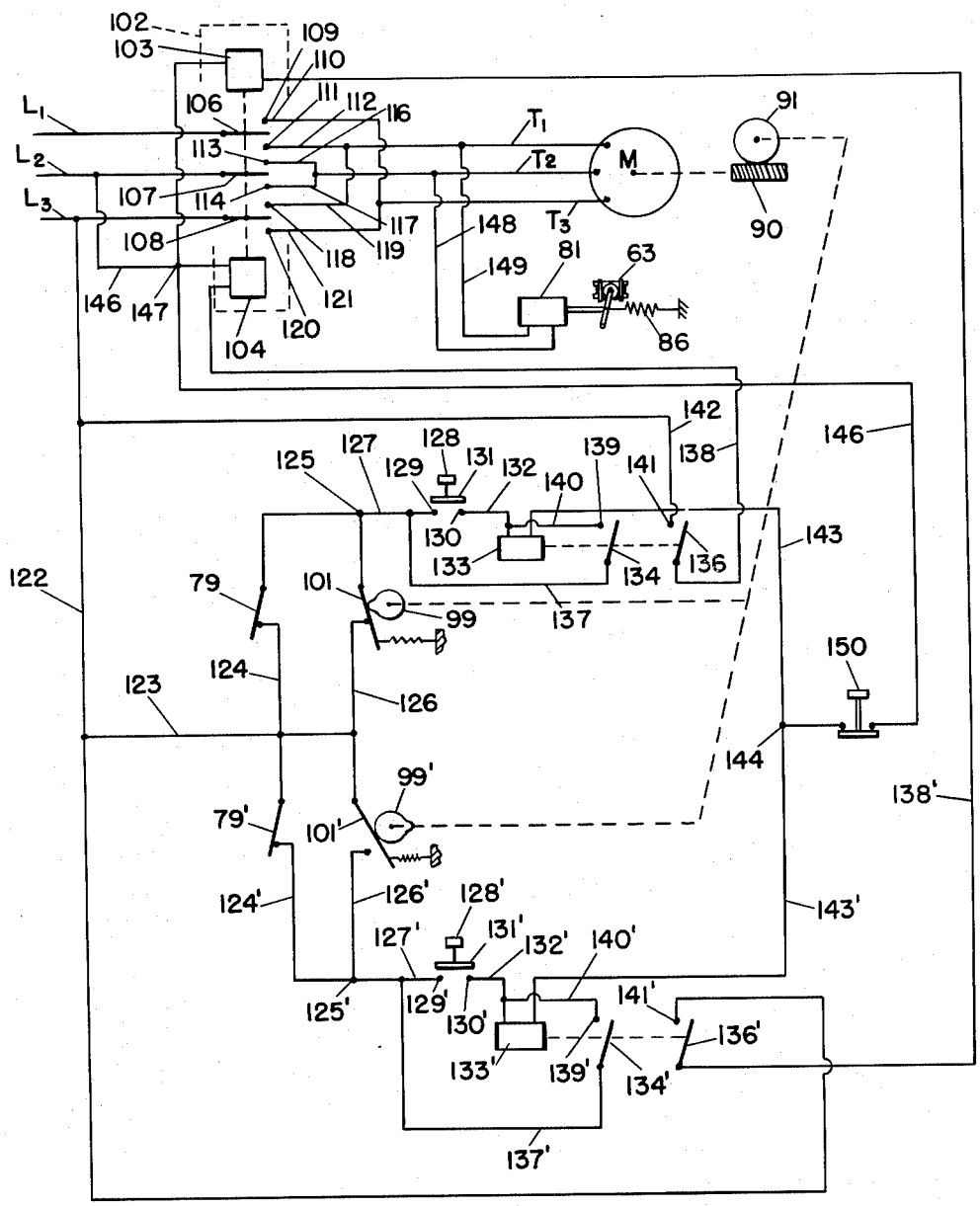
Fig. 7 is a schematic wiring diagram illustrating a circuit for controlling an electrically operated embodiment of the invention.

Reference is now made to Fig. 7 showing a schematic wiring diagram of the circuits for controlling the various electrically operated mechanisms of my invention. In the diagram a 3-phase reversible induction motor M is connected by means of lead wires T1, T2 and T3 to power lines L1, L2 and L3 through a double-throw motor reversing relay 102 having a neutral position, as shown, which is assumed when neither of its coils 103 or 104 is energized. Switch members 106, 107 and 108 are connected respectively to the power lines L1, L2 and L3, switch member 106 being movable between a contact 109 connected by a wire 110 to the lead T3, and a contact 111 connected by a wire 112 to the lead T1. Switch member 107 is movable between contacts 113 and 114 connected respectively by wires 116 and 117 to the lead T2. Switch member 108 is movable between a contact 118 connected by a wire 119 to the lead T1, and a contact 120 connected by a wire 121 to the lead T3.

Electrical power is conducted from the power line L3 to the opening and closing circuits through a power lead line 122 and a wire 123 connected thereto, the wire 123 being in turn connected to wires 124, 124' and 126, 126' which respectively connect with the torque responsive switches 79, 79' and the gear limit switches 101, 101' previously described. The valve opening and closing circuits being identical, only the opening circuit will be described, primed numbers being used to denote corresponding parts in the closing circuit. The wires 124 and 126 are connected in parallel to each other and join a wire 127 at a junction 125, the wire 127 being connected to a normally open starting switch 128 having contacts 129, 130 adapted to be bridged by a contact 131.

The contact 130 is connected by a wire 132 to a holding coil 133 which when energized actuates a pair of switch members 134, 136, the former being connected by a wire 137 to the wire 127, and the switch member 136 being connected by a wire 138 to one side of the coil 104. The switch member 134 when in the closed position under the influence of coil 133 is adapted to engage a contact 139 joined by a wire 140 to the wire 132, and the switch member 136 is simultaneously adapted to engage a contact 141 which is connected by a wire 142 to the lead line 122. The other side of the coil 133 is joined by a wire 143 through a junction 144 to a return line 146 which in turn is connected to the power line L2. Coils 103 and 104 are connected to the return line 146 at a junction 147. The solenoid 81 is connected across the lead wires T1 and T2 by means of wires 148, 149, and a normally closed stop switch 150 is provided in the return line 146 to permit cutting off of electrical power to the motor M and solenoid 81 at any time during operation of the valve operator. The normally closed torque switch 79 is positioned in the line 124, and the gear limit switch 101 is positioned in the line 126.

Electrical operation of the valve operator will now be described, reference being made particularly to Figs. 1, 2, 4, 5 and 7 during the description. If it is assumed that the valve to be operated is in its closed position, and that the motor M has not as yet been energized, the floating shaft 26 will be in its neutral position shown in Figs. 2 and 4, i. e., the racks 46 and 47 will be urged by the spring 48 to their outer limits as determined by the split rings 49 and 50. In this condition, the torque switches 79, 79' will both be closed; however, the cam 99 for actuating the gear limit switch 101 in the opening circuit will be so adjusted on its shaft 98 so as to maintain that switch closed during the first few revolutions of the worms 19, 90 when unseating the valve. The corresponding cam 99' for actuating the gear limit switch 101' in the closing circuit will of course be so adjusted on its shaft 98' as to allow the switch 101' to remain in its normally open position.

Let it be further assumed that the floating shaft 26 will be moved to the right in Figs. 2 and 4 under the helical thrust resulting from the unseating load on the valve stem or spindle 10 when opening the valve.

The starting button 128 now being depressed for opening the valve, the contact 131 bridges contacts 129 and 130, thereby closing the circuit through the holding coil 133 which pulls the switch members 134 and 136 respectively into engagement with contacts 139 and 141. Switch 134 being thus closed, power is maintained through the coil 133 even after the opening button 128 is released, whereby the switches 134 and 136 remain closed. Thus power is supplied to the coil 104 which pulls the switches 106, 107 and 108 into engagement respectively with contacts 111, 114 and 120, whereby power is supplied to motor M to cause it to turn in the opening direction. Simultaneously, solenoid 81 is energized, its armature 82 being retracted and displacing the arm 83 in opposition to the spring 86, thereby moving the clutch 63 from engagement with the manually operated spur gear 55 into engagement with the power driven gear 31.

Rotation of the driving pinion 37 is now transmitted to the worm gear 18 through the gear 36, floating shaft 26, gears 30, 31, shaft 20 and worm 19. As the worm gear 18 rotates it carries the hammer 25 through almost a complete revolution thereby allowing the motor to come up to full speed by the time the hammer strikes the lug 14 on the collar 12 keyed to the nut 11. When the hammer strikes the lug the resulting load on the gear train to the floating shaft 26 causes the shaft 26 to move, say, to the right in Figs. 2 and 4 under the helical thrust of one or both pairs of gears 30, 31 and 36, 37, thereby compressing the spring 48 beyond preload. Such movement of the shaft 26 also translates the rack 46 to the right, the rack 47 remaining stationary against its stop 50. Translation of the rack 46, as described, causes the pinion 70, shaft 71 and cam 72 to rotate, whereby the switch contact arm 78 depresses the button 80 of the switch 79, opening the latter.

However, power continues to be provided to the motor M through the gear limit switch 101 since the cam 99 is so designed and positioned on the shaft 98, and the gear ratio of the gear train between the worm 90 and shaft 98 is so calculated, that the cam remains in closing engagement with the switch button 100 until worm 19 has turned a sufficient number of times to unseat the valve.

When the valve is unseated, the torque at once returns to the lower valve which may be overcome by the spring 48, whereupon the latter resumes its preload position and the shaft 26 returns to its neutral position, the rack 46 moving now to the left (Figs. 2 and 4) until it abuts the stop ring 49. Such movement of the rack reverses the action of the shaft 71 and cam 72 previously described, removing the contact arm 78 from engagement with the button 80 and allowing the switch to assume its normally closed position. Upon further rotation of the worms 19 and 90, the gear limit cam 99 rotates to allow the switch 101 to assume its normally open position. Thereafter, any load on the torque transmitting worm 19 which produces a helical thrust in the power actuated gear train in excess of that which may be overcome by the spring 48, as will arise for example when the valve is being seated in the fully open position, will cause the torque responsive mechanism to operate, opening the circuit to relay 102

(coil 104), whereby power is cut off simultaneously from the motor M and solenoid 81, in consequence of which the spring 86 returns the clutch 63 into engagement with the spur gear 55 for manual operation of the valve. The dash-pot 89 delays the transit of clutch 63 from its engagement with the power driven gear 31 to the manually driven gear 55 to avoid transmission of any residual motion of shaft 20 to the hand wheel 62. Operation of the valve operator may be stopped at any time by opening the stop switch 150, which cuts off power to both the motor M and solenoid 81 as described above.

When the valve is in its closed position the gear limit switch 101' in the closing circuit will, of course, be open as shown in Fig. 7, so that if the closing switch 128' is accidentally actuated when the valve is closed, the torque switch 79' will be quickly opened, as above described, stopping the motor M and returning the clutch to engagement with the manual drive.

An alternative power system with which my improved valve operator may be employed is the pneumatic system diagrammatically shown in Fig. 8. This system comprises a reversible air motor M' connected to conduits 151, 151', both of which conduits may function as pressure or exhaust lines, depending upon whether the motor is to be rotated in the opening or closing direction. As with the foregoing description of the electrical operation of my valve operator, I shall describe only the parts of the pneumatic system used for opening the valve, it being understood that the corresponding parts for operation in the closing direction will be identified by corresponding primed numerals.

The conduit 151 communicates with one chamber 152 of a double-chamber poppet valve 153, the other chamber 154 of which is connected by a conduit 156 to a 4-way control valve 157 which may connect the conduit 156 to either a pressure line 158 or an exhaust line 159, as desired. The chambers of the valve 153 are separated by a partition 160 having an aperture 161 affording communication between the chambers. A valve closure or disc member 162 carried by a stem 163 is disposed within the valve in position to close the aperture 161 but is biased against closing by a compression spring 164. The stem 163 projects through the valve casing and thus may be externally engaged by one or both of cams or latches 166, 167 which are, respectively, carried by shaft 71 of the torque responsive mechanism and shaft 98 of the gear limit mechanism. The spring 164 is not strong enough to withstand normal operating pressure so that when air pressure from line 156 enters chamber 154 of the valve, valve closure member 162 is forced into its seated position over the aperture 161 unless one or both latches 166, 167 is in position to prevent extension of the stem 163. Both latches 166, 167 are positioned on their respective shafts 71, 98 so that the latches will be in contact with the stem 163 when the valve to be controlled is in the closed position. (In the air circuit for closing the valve to be controlled, the corresponding latch 166' is of course in contact with the stem 163', but the gear limit cam 167' is out of alignment with stem 163' so that any attempted further closing of the valve would be quickly halted by the torque operated cam, as will appear hereinafter.)

Serving the same function as the solenoid 81 in the electrical counterpart described above is a chamber 168 connected to the line 151 by a line 169, a check valve 170, and a line 171. A piston 172 having bleed holes 173 is disposed slidably within the chamber 168, the piston carrying a piston rod 174 which projects from the chamber 168 and is pivotally connected to an arm 83' for operating the clutch 63. Outward movement of the piston rod is opposed by a compression spring 86'. A bleed port 175 is provided in the chamber 168 on the opposite side of the piston from the line 171 to prevent pressure from equalizing on both sides of the piston.

In describing pneumatic operation of my valve operator reference is again made to Figs. 1, 2, 4 and 5, and, in addition, to the pneumatic diagram of Fig. 8, it being understood that the shafts 71, 71' will now be considered as carrying latches 166, 166', respectively, for engaging the poppet valve stems 163, 163', instead of the switch actuating cams 72, 72' previously described. Also, the gear limit shafts 98, 98' will now carry latches 167, 167' instead of the switch actuating cams 99, 99'. If it is now again assumed that the valve to be operated is seated in its closed position, operation of the valve operator for opening the valve is commenced by adjusting the 4-way valve 157 to the illustrated position in which air under pressure is directed from line 158, through line 156 to the poppet valve 153. Air entering chamber 154 tends to force the disc 162 into its closed position but this is prevented by the presence of latches 166, 167 under the stem 163. Thus air passes through valve 153 and line 151 to motor M' causing it to rotate in the opening direction. Air is exhausted from the motor through line 151', poppet valve 153', line 156', 4-way valve 157, and the exhaust line 159.

Simultaneously with the above action, part of the air from line 151 is taken off through the branch 169, check valve 170, and line 171, and is conducted to the chamber 168, whereby the piston 171 is forced away from the air intake end of the chamber, moving rod 174 in opposition to the spring 86'. Such movement of rod 174 rotates the arm 83' and its shaft 69 clockwise in Fig. 8 whereby the fork 68 moves the clutch 63 into engagement with the motor driven gear 31.

If the unseating torque is greater than can be accommodated by the spring 48, the floating shaft 26 and the rack 46 will be moved to the right in Figs. 2 and 4 under the resulting helical thrust, rotating pinion 70 and shaft 71 to remove the latch 166 from its supporting position under the stem 163. However, as was described above in connection with the electrical operation, the gear ratio of the gear limit mechanism operating from the worm 90 is such that the latch 167 remains in supporting position under the stem 163 until after the initial high torque due to unseating has passed, thus keeping the poppet valve open to supply air to the motor M'.

When the valve to be opened is unseated, the torque immediately returns to a lower value which can be overcome by the spring 48, whereupon the shaft 26 returns to neutral position and the rack 46 likewise moves to the left until it abuts its stop 49. Such return of the rack 46 to its original position reverses the action of the latch 166 previously described, bringing that latch once again into supporting position below the stem 163. Upon further rotation of the worms 19 and 90, the shaft 98 of the gear limit mechanism carries the latch 167 out of supporting contact with the latch 163. Thereafter, any load on the torque transmitting worm 19 and gear 31 which produces a thrust in excess of that which may be overcome by the spring 48, as will arise for example when the valve is being seated in the fully open position, will cause the torque responsive mechanism to operate once again to rotate latch 166 out of supporting position under the stem 163. The stem then being completely unsupported from below, the air entering chamber 154 of the poppet valve forces the valve disc 162 into its closed position against the action of spring 163, cutting off air to the motor M' as well as the chamber 168. Pressure in the latter chamber quickly drops as the air bleeds through the ports 173 and escapes from the chamber through the port 175. Spring 86' may then move the piston 172 toward the air intake end of the chamber, which action rotates the arm 83' and shaft 69 counterclockwise in Fig. 8, whereby the fork 68 moves the clutch 63 into engagement with the manually driven spur gear 55.

If, when the valve to be operated is in the closed position, the 4-way valve is accidentally adjusted to conduct air under pressure through the poppet valve 153' causing the motor M' to rotate in the closing direction, the resulting torque will quickly cause the torque responsive latch 166' to rotate out of supporting position under the stem 163', as previously described, and since the gear limit actuated latch 167' is out of alignment with the steam 163', the disc 162' will be forced by the pressure of the air entering chamber 154' of poppet valve 153' to close the aperture 161', whereupon air will be cut off from valve motor M' and chamber 168. Thus not only will the valve motor cease to run but spring 86' will quickly prevail against any pressure which has been built up in chamber 168 to move arm 83' counterclockwise (in Fig. 8) and thereby shift the clutch 63 into engagement with the manually driven spur gear 55.

It will be understood that the invention illustrated and described herein is susceptible of various modifications in construction, form and relative arrangement of parts, which modifications will now appear to those skilled in the art, without departing from the scope of the invention. Reference is, therefore, to be had to the appended claims for a definition of the limits of the invention.

What I desire to claim is:

1. In a valve operator for a valve in which the closure member is positioned in response to rotation of a torque transmitting member, the improvement which comprises a gear train for driving said torque transmitting member including a first pair of meshed gears, one of said gears being operatively connectable with said torque transmitting member, the other of said gears being fixed to a floating shaft adjacent one end thereof, a second pair of meshed gears one of which is fixed to said floating shaft adjacent the other end thereof, the other of said second pair of gears being connected to a power driving means, at least one of said pairs of gears being provided with helical teeth whereby said floating shaft is displaced longitudinally in response to the helical thrust of said helical teeth resulting from a predetermined load on said one of said first mentioned pair of gears, a clutch adapted, in response to the application of power to said power driving means, to connect said one of said first mentioned pair of gears with said torque transmitting member and, upon discontinuance of the application of power to said power driving means, to disconnect said one of said first mentioned pair of gears from said torque transmitting member, and means responsive to longitudinal displacement of said floating shaft for controlling the application of power to said power driving means.

2. In a valve operator for a valve in which the closure member is positioned in response to rotation of a torque transmitting member, the improvement which comprises a helical gear operatively connectable with said torque transmitting member, a power operated helical driving pinion, a floating shaft connected at one end by a helical gear to said driving pinion and connected at the other end by a helical pinion to said first mentioned helical gear, said shaft being displaceable longitudinally in response to the helical thrust thereon resulting from a predetermined load on said first mentioned helical gear, a clutch for selectively connecting and disconnecting said first mentioned helical gear with said torque transmitting member, means normally urging said clutch in a direction to disconnect said first mentioned helical gear from said torque transmitting member, means responsive to the application of power to operate said helical driving pinion for moving said clutch in a direction to connect said first mentioned helical gear with said torque transmitting member in opposition to said urging means, and means responsive to longitudinal displacement of said shaft for controlling the said application of power.

3. Apparatus in accordance with claim 2, including a manually operable driving gear, and wherein said clutch is adapted, under the influence of said urging means, to connect the latter with said torque transmitting member.

4. In a valve operator for a valve in which the closure member is positioned in response to rotation of a torque transmitting member, the improvement which comprises a helical gear operatively connectable with said torque transmitting member, a helical driving pinion, power operated driving means for said driving pinion, a floating shaft connected at one end by a helical gear to said driving pinion and connected at the other end by a helical pinion to said first mentioned helical gear, said shaft being displaceable longitudinally in response to the helical thrust thereon resulting from a predetermined load on said first mentioned helical gear, a clutch for selectively connecting and disconnecting said first mentioned helical gear with said torque transmitting member, means normally urging said clutch in a direction to disconnect said first mentioned helical gear from said torque transmitting member, means responsive to the application of power to said driving means for moving said clutch in a direction to connect said first mentioned helical gear with said torque transmitting member in opposition to said urging means, and means responsive to longitudinal movement of said shaft for cutting off power to said driving means after a predetermined amount of said longitudinal movement of said shaft.

5. Apparatus in accordance with claim 4, including means responsive to rotation of said torque transmitting member for rendering ineffective said fourth mentioned means until said torque transmitting member has rotated a predetermined angular distance.

6. Apparatus in accordance with claim 4 including resilient means opposing said longitudinal displacement of said shaft.

7. In a valve operator for a valve in which the closure member is positioned in response to rotation of a torque transmitting member, the improvement which comprises a helical gear connectable in driving relation with said torque transmitting member, a helical driving pinion, a motor for driving said pinion, a floating shaft connected adjacent one end by a helical gear to said driving pinion and connected adjacent its other end by a helical pinion to said first mentioned helical gear, said shaft being displaceable longitudinally in response to the helical thrust thereon resulting from a predetermined load on said first mentioned helical gear, a manually operable driving gear also connectable in driving relation with said torque transmitting member, a clutch for selectively connecting said first mentioned helical gear and said manually operable driving gear with said torque transmitting member, means normally urging said clutch in a direction to connect said manually operable driving gear with said torque transmitting member, means responsive to the application of power to said motor for moving said clutch in a direction to connect said first mentioned helical gear with said torque transmitting member in opposition to said first mentioned means, and means responsive to longitudinal displacement of said shaft for controlling said application of power to said motor.

8. In a valve operator for a valve in which the closure member is positioned in response to rotation of a torque transmitting member, the improvement which comprises a helical gear connectable in driving relation with said torque transmitting member, a helical driving pinion, an electric motor for driving said pinion, a floating shaft connected adjacent one end by a helical gear to said driving pinion and connected adjacent its other end by a helical pinion to said first mentioned helical gear, said shaft being displaceable longitudinally in response to the helical thrust thereon resulting from a predetermined load on said first mentioned helical gear, a manually operable driving gear also connectable in driving relation with said torque transmitting member, a clutch for selectively connecting said first mentioned helical gear and said manually operable driving gear with said torque transmitting member, means including a spring normally urging said clutch in a direction to connect said manually operable driving gear with said torque transmitting member, a solenoid for moving said clutch in the direction to connect said first mentioned helical gear with said torque transmitting member in opposition to said spring, an electrical circuit for supplying power to said motor and said solenoid, and means responsive to longitudinal movement of said shaft for opening said circuit after a predetermined amount of said longitudinal movement.

9. Apparatus in accordance with claim 8 including damping means for said spring effective, after said clutch has been disengaged from said first mentioned helical gear, to delay engagement of said clutch with said manually operable driving gear.

10. Apparatus in accordance with claim 8, wherein said electrical circuit includes a parallel branch for also supplying power to said motor and said solenoid, and including means responsive to rotation of said torque transmitting member for opening and closing said parallel branch.

11. In a valve operator for a valve in which the closure member is positioned in response to rotation of a torque transmitting member, the improvement which comprises a helical gear connectable in driving relation with said torque transmitting member, a helical driving pinion, an electric motor for driving said pinion, a floating shaft connected adjacent one end by a helical gear to said driving pinion and connected adjacent its other end by a helical pinion to said first mentioned helical gear, said shaft being displaceable longitudinally in response to the helical thrust thereon resulting from a predetermined load on said first mentioned helical gear, a manually operable driving gear also connectable in driving relation with said torque transmitting member, a clutch for selectively connecting said first mentioned helical gear and said manually operable driving gear with said torque transmitting member, means including a spring normally urging said clutch in a direction to connect said manually operable diving gear with said torque transmitting member, a solenoid for moving said clutch in the direction to connect said first mentioned helical gear with said torque transmitting member in opposition to said spring, an electrical circuit for supplying power to said motor and said solenoid, a normally closed switch in said circuit, a rack member carried by said shaft and movable therewith, a pinion engaging said rack and rotatable upon movement of said rack with said shaft, and means actuable in response to rotation of said last mentioned pinion to open said switch and thereby cut off power simultaneously to said motor and said solenoid.

12. Apparatus in accordance with claim 11, including a worm connected to said torque transmitting member and rotatable therewith, a worm gear fixed to a second shaft and meshed with said worm, a gear limit mechanism in driven relation to said second shaft and having an output shaft carrying a switch actuating member, and a second switch in said circuit in parallel with said first mentioned switch, said second switch being actuable by said switch actuating member in response to rotation of said worm.

13. Apparatus in accordance with claim 11, including resilient means acting on said rack in opposition to said helical thrust.

14. In a valve operator for a valve in which the closure member is positioned in response to rotation of a torque transmitting member, the improvement which comprises a helical gear connectable in driving relation with said torque transmitting member, a helical driving pinion, a reversible air motor for driving said pinion, a floating shaft connected adjacent one end by a helical gear to said driving pinion and connected adjacent its other end by a helical pinion to said first mentioned helical gear, said shaft being displaceable longitudinally in response to the helical thrust thereon resulting from a predetermined load on said first mentioned helical gear, a manually operable driving gear also connectable in driving relation with said torque transmitting member, a clutch for selectively connecting said first mentioned helical gear and said manually operable driving gear with said torque transmitting member, means including a spring normally urging said clutch in a direction to connect said manually operable driving gear with said torque transmitting member, pneumatic means for moving said clutch in the direction to connect said first mentioned helical gear with said torque transmitting member in opposition to said spring, an air supply line for supplying air under pressure to said motor and said pneumatic means, a control valve in said line for controlling said air supply, a closure disc in said control valve for closing the latter, resilient means urging said disc toward its open position but incapable of overcoming normal operating pressure in said line tending to close said control valve, and latch means adapted normally to hold said closure disc in open position in opposition to said pressure but movable out of said holding position in response to a predetermined longitudinal movement of said shaft.

15. Apparatus in accordance with claim 14 including a second latch for holding said closure disc in the said open position, said second latch being operable independently of said first mentioned latch and movable into and out of its said holding position in response to rotation of said torque transmitting member through a predetermined angular distance.

16. In a valve operator for a valve in which the closure member is positioned in response to rotation of a torque transmitting member, the improvement which comprises a helical gear connectable in driving relation with said torque transmitting member, a helical driving pinion, a reversible air motor for driving said pinion, a floating shaft connected adjacent one end by a helical gear to said driving pinion and connected adjacent its other end by a helical pinion to said first mentioned helical gear, said shaft being displaceable longitudinally in response to the helical thrust thereon resulting from a predetermined load on said first mentioned helical gear, a manually operable driving gear also connectable in driving relation with said torque transmitting member, a clutch for selectively connecting said first mentioned helical gear and said manually operable driving gear with said torque transmitting member, means including a spring for normally urging said clutch in a direction to connect said manually operable driving gear with said torque transmitting member, pneumatic means for moving said clutch in the direction to connect said first mentioned helical gear with said torque transmitting member in opposition to said spring, an air supply line for supplying air under pressure to said motor and said pneumatic means, a control valve in said line for controlling said air supply, said control valve having a closure member carried by a control stem projecting from the body thereof and biased in the extended position, said closure member being adapted to close said control valve when said stem is in said extended position and to open said control valve when said stem is retracted, and latch means normally holding said stem in its retracted position but movable out of said holding position in response to a predetermined longitudinal movement of said shaft, whereby said stem may move to its extended position.

17. Apparatus in accordance with claim 16 including a second latch for holding said stem in its retracted position, said second latch being operable independently of said first mentioned latch and movable into and out of said holding position with respect to said stem in response to rotation of said torque transmitting member through a predetermined angular distance.

References Cited in the file of this patent
UNITED STATES PATENTS

| | | |
|---|---|---|
| 2,318,010 | Panish | May 4, 1943 |
| 2,324,211 | Hodgson | July 13, 1943 |